United States Patent [19]

Atkinson, Jr.

[11] 4,286,581

[45] Sep. 1, 1981

[54] SOLAR ENERGY CONVERSION SYSTEM

[75] Inventor: John H. Atkinson, Jr., Laguna Beach, Calif.

[73] Assignee: Advanced Solar Power Company (ASPCO), Newport Beach, Calif.

[21] Appl. No.: 973,444

[22] Filed: Dec. 26, 1978

Related U.S. Application Data

[63] Continuation-in-part of Ser. No. 665,369, Mar. 10, 1976, abandoned.

[51] Int. Cl.³ .............................................. F24J 3/02
[52] U.S. Cl. .................................. 126/439; 126/424; 126/437; 126/440; 126/452
[58] Field of Search ............... 126/444, 424, 440, 425, 126/437, 438, 439, 442, 450; 60/641, 659; 165/135 R

[56] References Cited

U.S. PATENT DOCUMENTS

| | | | |
|---|---|---|---|
| 408,929 | 8/1889 | Reynolds | 126/440 |
| 696,326 | 3/1902 | Garza | 126/440 |
| 1,920,094 | 7/1933 | Martin, Jr. | 60/641 |
| 1,951,403 | 3/1934 | Goddard | 60/641 |
| 1,969,839 | 8/1934 | Goddard | 126/439 |
| 1,989,999 | 2/1935 | Niederle | 126/443 |
| 2,259,902 | 10/1941 | McCain | 126/440 |
| 2,486,833 | 11/1949 | Freund | 126/437 |
| 3,159,554 | 12/1964 | Mount | 126/432 |
| 3,203,167 | 8/1965 | Green, Jr. | 126/438 |
| 3,234,931 | 2/1966 | Whitaker | 126/438 |
| 3,363,618 | 1/1968 | Dominguez | 126/432 |
| 3,901,036 | 8/1975 | Martin | 126/440 |
| 4,010,614 | 3/1977 | Arthur | 126/439 |
| 4,018,212 | 4/1977 | Hein et al. | 126/451 |
| 4,033,118 | 7/1977 | Powell | 60/641 |
| 4,051,835 | 10/1977 | Hinson-Rider | 126/440 |

FOREIGN PATENT DOCUMENTS 1035833  4/1951  France ..................................... 126/432

OTHER PUBLICATIONS

Kreith, Frank, Principles of Heat Transfer, Scranton, Pa., International Textbook Co., 1965, pp. 448-453.

Primary Examiner—James C. Yeung
Attorney, Agent, or Firm—Knobbe, Martens, Olson, Hubbard & Bear

[57] ABSTRACT

A solar energy collection and conversion system is disclosed in which a cassegrain mirror system is rotated about a diurnal axis, which axis is adjusted for seasonal variations in the incidence of the sun's rays on the earth's surface. A black body absorption cavity filled with translucent or transparent fluid material is used for direct absorption of the sun's rays. The incident solar energy is absorbed directly by the fluid medium. The fluid within the cavity may be maintained under extremely high pressures and temperatures in order to utilize this fluid as a heat storage medium. Such heat storage is facilitated by apparatus which permits a change in the volume of the reflective cavity in response to the temperature or pressure of the fluid within the cavity.

59 Claims, 14 Drawing Figures

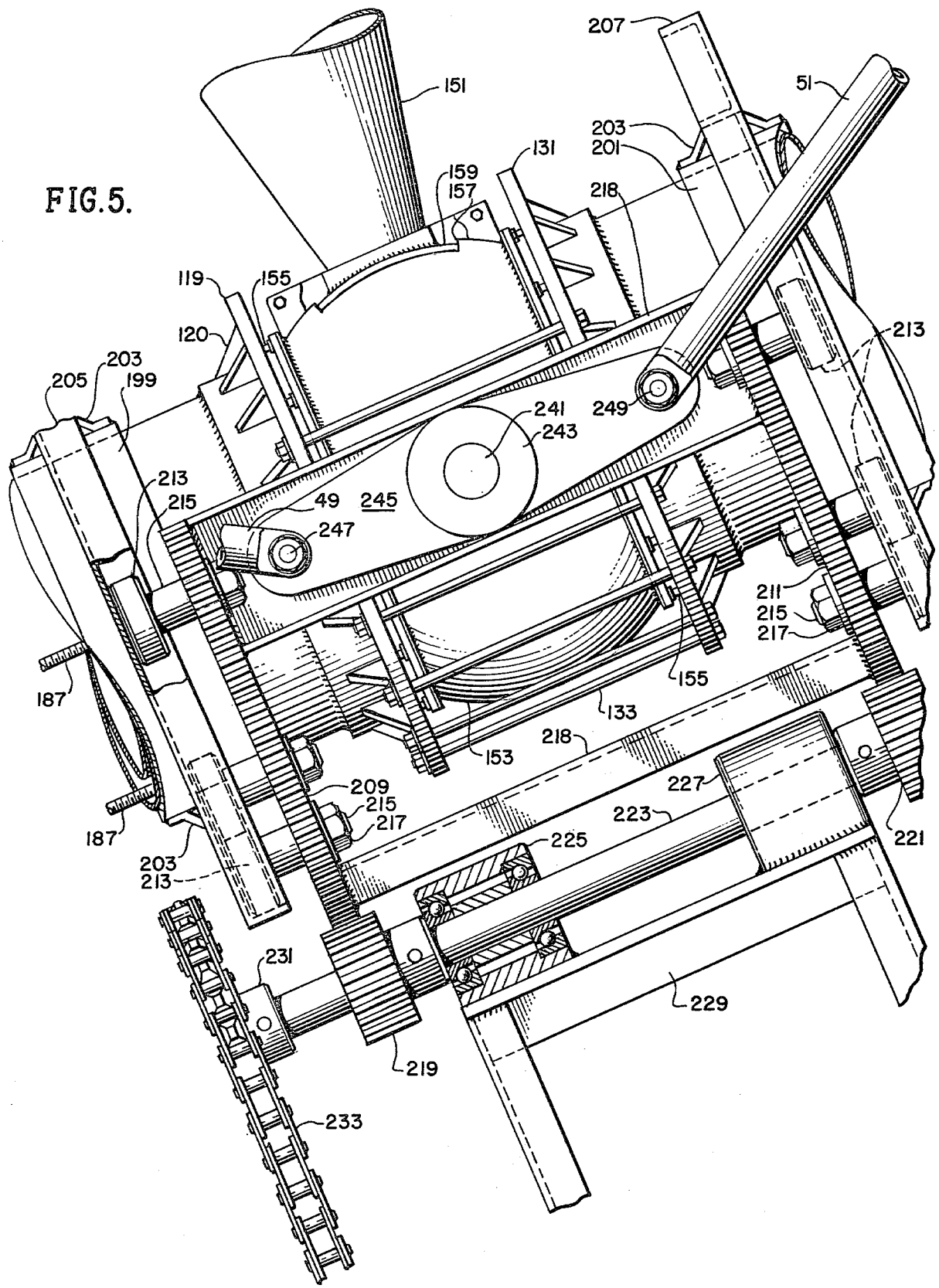

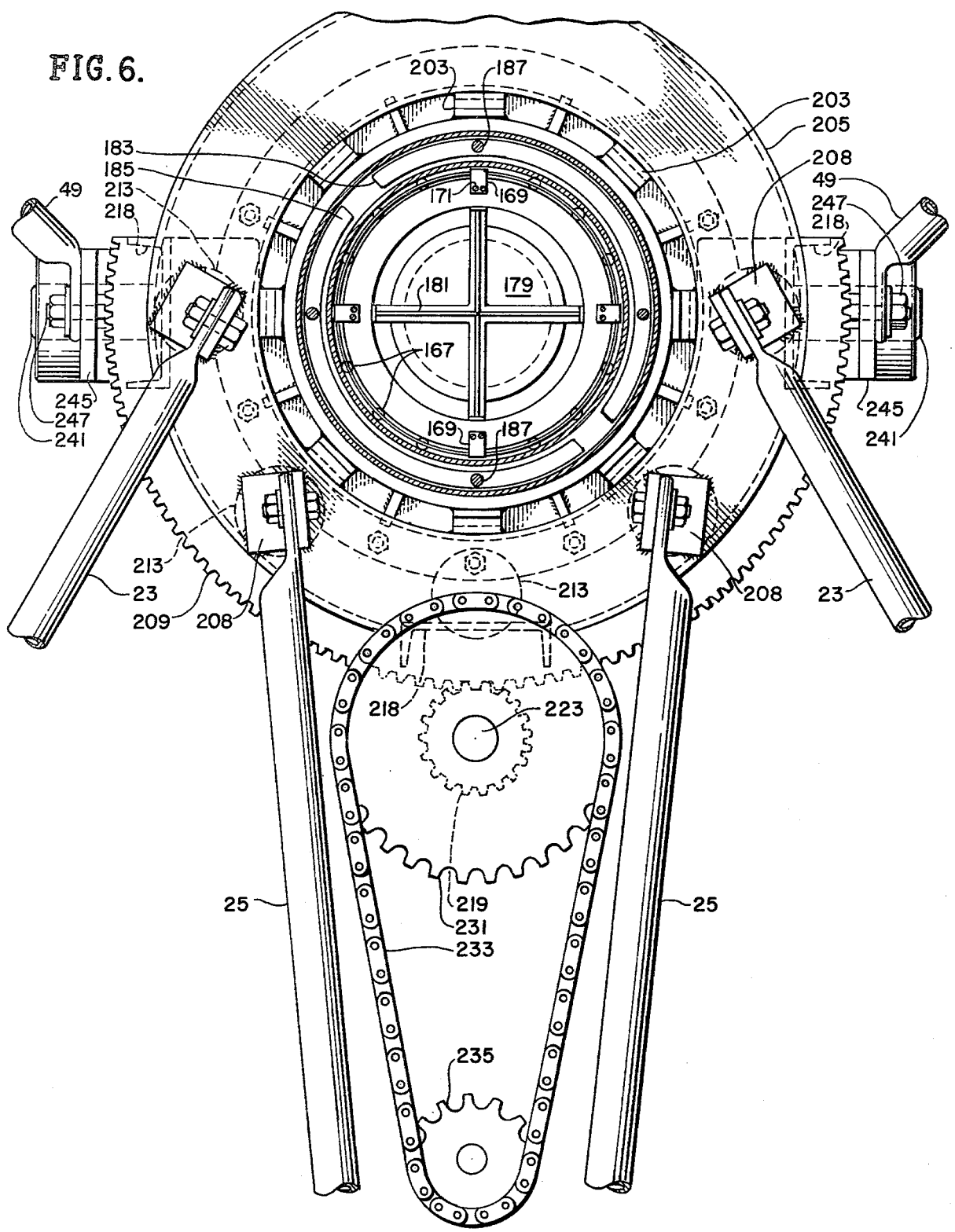

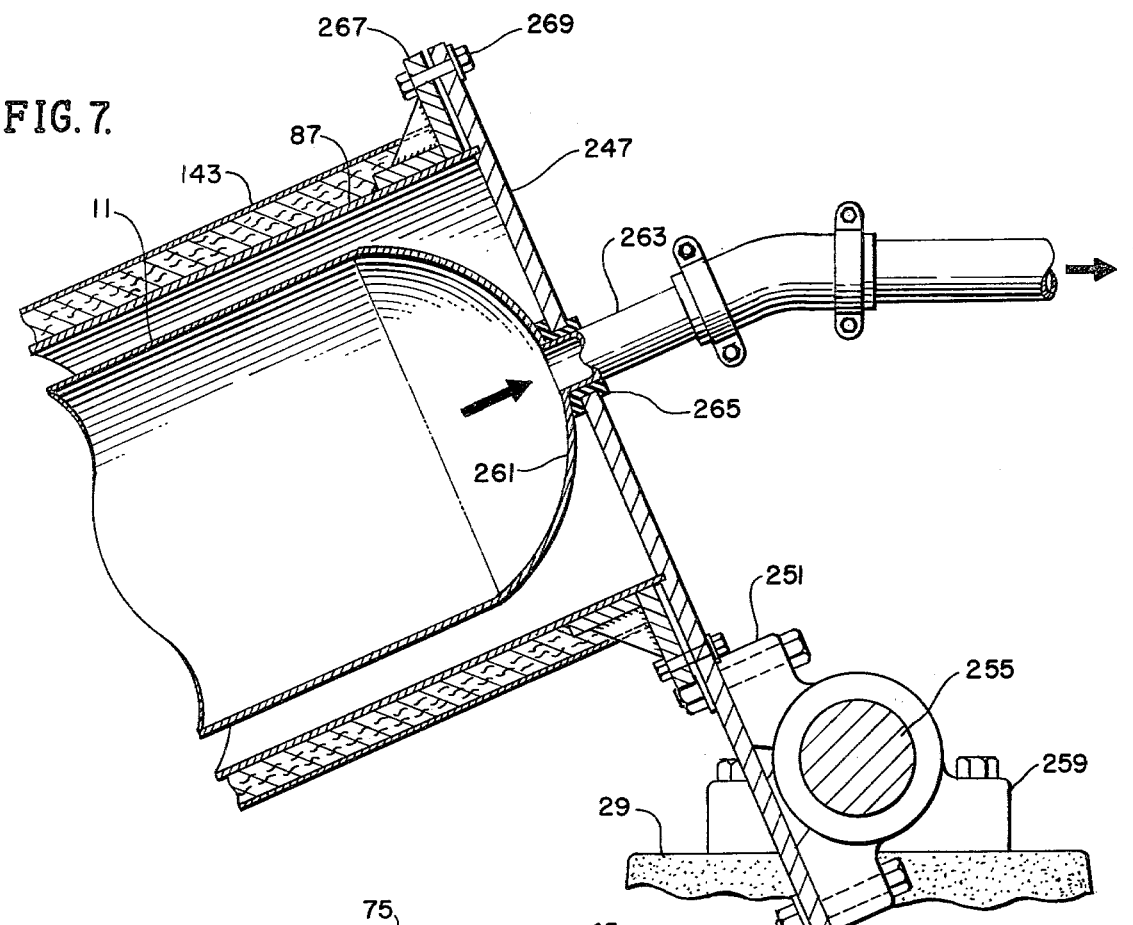

SOLAR ENERGY CONVERSION SYSTEM

RELATED APPLICATION

This is a continuation-in-part of Application Ser. No. 665,369, filed Mar. 10, 1976, abandoned entitled SOLAR ENERGY CONVERSION SYSTEM.

BACKGROUND OF THE INVENTION

All of the earth's conventional power sources such as oil, coal, and running water are originally derived from the sun. For many years attempts have been made to use the heat of the sun directly for power and domestic needs. Outside the earth's atmosphere, an average 1350 watts per square meter is available. Under good conditions, such as a cloudless desert, approximately 1000 watts per square meter is available at the earth's surface.

Solar energy conversion systems described in the prior art are generally either so complex as to require enormous capital investment, making their utilization virtually impractical; or are so unsophisticated that their efficiency in absorbing and converting solar energy is too low to make their application practical. In the first extreme, there are numerous prior art disclosures of complicated heat storage systems utilizing state changes in various salts and other materials, many of which are extremely caustic in one state or the other, and all of which are subject to significant losses through the fundamental inefficiency of heat transfer apparatus used for transferring heat absorbed by collection units to the storage materials. Other costly aspects of complicated prior art systems include the use of multiple heliostats for redirecting the sun's rays, each of which must be individually controlled in order to track the relative motion of the sun and the earth's surface, the use of critical reflective or refractive surfaces often in shapes and forms which are extremely expensive to manufacture, and through the use of exotic materials which substantially increase the capital investment required for the collection of solar energy. Another example of the first extreme has been the use of solar power in solar furnaces. These are very large arrays of optical elements which concentrate sunlight into a small area producing very high temperatures at the focus. These elements are often unique, very large and expensive installations, with only a few operating worldwide. They are principally used for materials experiments and limited production of ceramic and abrasive materials, which cannot be readily produced in any other way. A typical working temperature for a solar furnace is 3,000° K. This first extreme also includes the direct generation of electricity from solar radiation falling on solar cells such as are widely used in the space program. Because each cell can produce only low voltage and current levels, a great number of cells are needed to produce substantial amounts of electrical energy. Each cell requires two individual electrical connections and labor costs for millions of connections become prohibitive except for critical uses in inaccessible places. There are also inherent problems in transmitting low voltage direct current, and storage of large amounts of power in batteries is not presently economical.

In the other extreme, most relatively simple or unsophisticated collectors are flat plate collectors which expose large flat heat absorbing surfaces of the sun's rays. These collectors are extremely inefficient in that a substantial portion of the collected energy is reradiated, the surface which forms an efficient collector also forming an efficient radiator. Substantial heat is also lost through convection to the atmosphere. In addition, such systems, by definition, must operate at relatively low temperatures which make the storage of heat extremely expensive, since an enormous bulk of low temperature storage must be provided. Nonetheless, the main current thrust of solar energy research an development programs is directed toward production of low grade power at relatively low temperatures for domestic water and space heating. There is also considerable interest in solar powered air conditioning using the Servel process. Extensive commercial use of low grade solar power awaits the development of efficient and economical collectors so that vast areas are not needed to collect sufficient power. The basic technical problem is the development of an economical material which will absorb sunlight with an effective temperature of 6,000° K. (10,000° F. and not reradiate at a working temperature of around 350° K. (170° F.) to typical surroundings at 300° K. (80° F.).

In summary large scale utilization of solar energy for replacing energy presently produced by depleting natural resources such as fossil fuels has not been practical in the past since no system has been produced which combined efficiency and economy, so that both capital expense and operating expenses could be maintained at a sufficiently low level that the solar energy produced could compete economically with fuel burning systems.

SUMMARY OF THE INVENTION

The present invention provides a very significant advance in the solar energy collection and conversion field, since it permits the manufacture of reasonably priced collection equipment which operates extremely efficiently and incorporates self-contained heat storage capabilities sufficient to overcome the inherent deficiency of solar energy, that is, the absence of the energy source at night and on cloudy days.

Fundamentally, these advantages are accomplished through an efficient, low cost optical system for the concentration of solar energy and through the direct absorption of this energy by a working fluid. Such a system permits the storage of the working fluid itself at extremely high temperatures and pressures to provide energy during time periods of total or partial darkness.

The preferred embodiment of this apparatus includes a cassegrain optical system incorporating a primary reflective concave mirror directed toward the sun and including a central aperture. Attached to and spaced from this primary mirror is a secondary convex mirror coaxial with the primary mirror and aligned to collect and focus through the aperture of the primary mirror solar rays reflected by the primary mirror.

This entire optical system is rotated about a diurnal axis and adjusted for seasonal variations so that the focal point of the entire optical system is fixed relative the earth's surface.

Along the average diurnal axis, that is, the diurnal axis at equinox, a high pressure vessel in the form of an elongate pipe conducts a transparent or translucent working fluid. The portion of this pipe adjacent the focal point of the optical system is provided with a toroidal lens system which refracts the incident focused solar rays along the axis of the pipe. The entire inner surface of the high pressure pipe is highly reflected so that rays entering the pipe cavity are reflected to pass through the working fluid repeatedly until the radiation energy is totally absorbed by the fluid itself, the reflective walls substantially prohibiting absorption of the energy by the pipe itself. The toroidal lens system is contained in a highly reflective shutter which rotates so that only the sun's image falls on the aperture. The optically closed pipe acts as a black body cavity, rapidly distributing the incident radiation throughout the transparent or translucent medium contained and quickly raising this medium to temperature equilibrium. Energy cannot be reradiated through the aperture to the much hotter sun without violating the first law of thermodynamics. Because energy is absorbed from radiative transfer in the bulk of the material contained in the pipe, the outer walls of the container may be kept cool as, for example, by insulation. Since radiative energy transfers occur in accordance with the following formula $\Delta E = \sigma(\Delta T)^4$ where $\Delta E$ is the energy transferred, $\sigma$ is the Stefan-Boltzmaun constant, and $\Delta T$ is the difference in absolute temperatures, radiative losses predominate. Thus, maintaining the outside of the container cool eliminates most losses. The system provides energy collection and absorption efficiencies near 90%, which is 10 times or more greater than that for a typical solar power system. The maximum temperature available on the earth from solar heating is 6,000° K. (10,000° F.). Because of the high efficiency of this system, working temperatures approaching this limit are possible for relatively small amounts of material. The flow of working fluid through the cavity is adjusted to give the desired working temperatures and pressures in that part of the system.

The optical concentration system may be mounted on the high pressure pipe or separately, but rotates about the pipe in accordance with the daily rotation of the earth to assure that the solar radiation is focused through the toroidal lens system.

During periods of substantial incident solar energy, when the entire energy capacity of the device is not necessary for producing power, the working fluid within the high pressure pipe may be heated and pressurized, thus absorbing a large amount of solar energy. This energy may be removed from the system by permitting flow of the working fluid from the high pressure pipe. Thus, in those instances where water is selected as the working fluid, a substantial bulk of water may be elevated in temperature and sufficiently pressurized so that the water absorbs a large amount of energy. By permitting this heated, pressurized water to escape from the high pressure pipe to a lower pressure cavity, the water will immediately vaporize to produce high pressure steam which may be used, for example, to run a turbine system for generating electricity.

It will be understood that during periods of substantial incident solar energy continuous flow of working fluid to the system may be maintained by a high pressure pump, the black body cavity being maintained at very high pressure to prohibit vaporization of the working fluid within the cavity. This working fluid is continuously removed from the system and permitted to vaporize for operating, for example, a turbine. At the same time the cavity itself may store sufficient working fluid to form a substantial energy reserve.

The reflective cavity formed by the walls of the high pressure pipe may be changed in volume during such use to provide for the storage of different amounts of thermal energy. This is accomplished through the use of a mirror positioned within the high pressure pipe and moved along the pipe by a control system. If this mirror is properly ported for the through flow of working fluid, no pressure differential occurs across the mirror so that a relatively simple and preferably remotely actuated driving system may be used for positioning the mirror. As this mirror is moved away from the toroidal lens, the portion of the high pressure pipe which forms the reflective reservoir is changed in volume, permitting a servo system to maintain the pressure and temperature of the working fluid within the high pressure pipe by storing additional thermal energy when the source energy exceeds the demand.

In a typical installation, a high pressure pump supplies the working fluid, such as water, to the downstream end of the high pressure pipe. This water flows through the movable mirror into the reflective cavity and directly absorbs energy reflected through it by the cavity walls and the optical system. The water temperature is raised and the pressure within the vessel is maintained at a level prohibiting vaporization of the water. The outlet or upstream end of the high pressure pipe is connected through a control valve to a turbine, the control valve separating the higher pressure and lower pressure zones within an outlet pipe and permitting the working fluid to vaporize on the downstream side of the valve, the steam thus produced being used to operate a turbine. The system may be totally self contained if the exhaust steam from the turbine is condensed to provide water supply for the high pressure pump or may be operated on available water supply with the exhaust steam from the turbine vented to atmosphere.

These and other features of the present invention are best understood through the following detailed description of a preferred embodiment which references the drawings, in which:

FIG. 5 is an elevation view, partially in section, of the gearing system located adjacent the focal point of the optical system of FIG. 1 and used for rotating the optical system about the high pressure pipe;

FIG. 6 is a sectional view taken along lines 6—6 of FIG. 4;

FIG. 7 is a sectional view of the outlet end portion of the high pressure pipe of the system of FIG. 1 enlarged to show the details thereof;

FIG. 8 is a perspective view of the mounting and rotating apparatus of FIG. 1, with the high pressure pipe and optical system removed to facilitate understanding of the system used for rotating the optical system about the diurnal axis;

DETAILED DESCRIPTION OF THE PREFERRED EMBODIMENT

Figure 1:
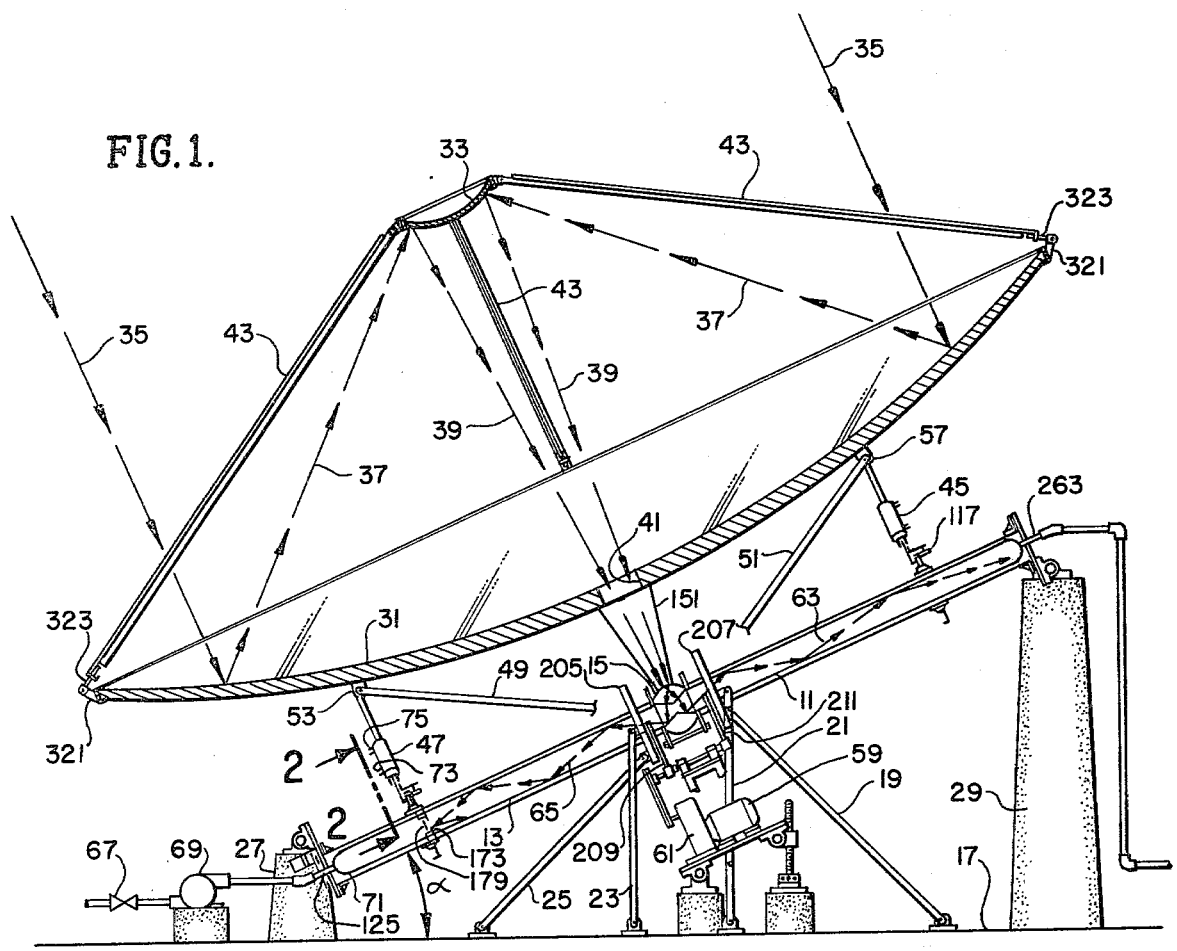
FIG. 1 is a sectional view of the solar collection and conversion system, the view taken through a plane which bisects the high pressure pipe and optical system.

Referring initially to FIG. 1, the solar collection and conversion system of the present invention includes a high pressure cavity formed, for example, from a pair of high pressure pipes 11 and 13 joined by a toroidal lens 15. The high pressure pipes 11, 13 include inside walls which are polished or coated to provide a highly reflective interior surface. The pipes 11, 13 are supported from a base 17 which may be, for example, a concrete foundation pad, by plural supporting struts 19, 21, 23 and 25 as well as concrete pylons 27 and 29. Each of the struts 19, 21, 23, 25 and concrete pylons 27, 29 illustrated in FIG. 1 are duplicated by identical supporting structures on the opposite side of the high pressure pipes 11, 13, as specifically shown in FIGS. 6 and 8 so that the structure is braced against static loads as well as wind forces. The system is arranged such that the pipes 11 and 13 and their supporting structure are rigidly mounted on the foundation 17 and neither move nor rotate, so that high pressure fittings connecting working fluid to and from the pipes 11 and 13 need not include expensive rotating or articulating couplings.

An optical collection and focusing system is arranged to rotate about a diurnal axis coincident with the stationary pipes 11, 13. This optical system is a two-mirror cassegrain system including a primary mirror 31 and secondary mirror 33. The primary mirror 31 has a parabolic concave surface which is highly reflective for collecting and reflecting parallel solar rays 35 toward the secondary mirror 33, as shown at 37. The secondary mirror 33 is a much smaller, convex, paraboloidal mirror which in turn reflects the rays 37 toward a single focus, as shown at 39. The rays 39 pass through an aperture 41 at the center of the primary mirror 31 and converge on the toroidal lens 15, so that substantially all of the incident radiation 35 is concentrated at the lens 15.

In order to maintain the focus of solar radiation at the toroidal lens 15, it is necessary to maintain the axis of the primary mirror 31 parallel to the incident radiation 35. This is accomplished by mounting the entire optical system, including the primary mirror 31 and secondary mirror 33 which is attached thereto by plural struts 43, for rotation about a diurnal axis formed by the high pressure pipes 11, 13. The details of this mounting and rotational system will be explained below.

The entire solar energy conversion system is mounted on the foundation 17 such that the high pressure pipes 11, 13 are parallel to the rotational axis of the earth. This is accomplished by mounting the inlet end of the pipe 13 lower than the outlet end of the pipe 11, so that the angle $\alpha$ is equal to the earth's latitude at the installation location. The concrete pylons 29 are placed due north of the concrete pylons 27 in the northern hemisphere, and due south of the concrete pylons 27 if the installation is in the southern hemisphere. When installed in this manner, and with the axis of the cassegrain mirrors 31 and 33 perpendicular to the axis of the pipes 11 and 13, all incident solar radiation will be focused through the toroidal lens 15 at each equinox.

In order to adjust for seasonal relative movement of the sun and earth, hydraulic actuators 45 and 47 are used to pivot the cassegrain system, including the mirrors 31, 33, about a pivotal axis coincident with the toroidal lens 15 and perpendicular to the pipes 11, 13. A pair of struts 49 and 51 are connected at the rotational axis to support flanges 53 and 57, respectively, extending from the rear of the primary mirror 31. It will be recognized from the remaining figures that each of the actuators 45 and 47 of FIG. 1 are duplicated by an identical pair of actuators on the opposite side of the high pressure pipes 11, 13, there being four spaced support flanges 53, 57 on the rear surface of the mirror 31. In addition, an identical pair of struts 49, 51 exist on the other side of the high pressure pipes 11, 13 so that these struts 49, 51 and actuators 45, 47 cradle the primary mirror 31 and support its entire weight.

A clock drive 59, in conjunction with a gearing system 61, to be described in detail below is utilized to rotate the cassegrain mirror system about the diurnal axis formed by the pipes 11, 13 on a daily basis, the mirrors 31 and 33 rotating through approximately 180° during each day and being recycled through the same 180° rotation at night to begin another daily diurnal rotation on the following dawn. This diurnal rotation of the mirror system, combined with the seasonal adjustments made by the actuators 45 and 47, assures that the rays 39 are always focused at the stationary toroidal lens 15. The incident radiation 39 is refracted by the toroidal lens 15, in a manner described in more detail below, to travel the length of the pipes 11 and 13 as shown at 63 and 65, respectively. Because of the reflective surface on the inside of the high pressure pipes 11, 13, this radiation 63, 65 is repeatedly reflected from the walls of the absorption black body cavity formed by the pipes 11, 13 so that, after passing repeatedly through the working fluid within the pipes 11, 13, the solar energy is totally absorbed directly by the working fluid. The reflective interior surfaces of the pipes 11, 13 substantially prohibits absorption of this energy by the pipes themselves. Input working fluid, such as water, is supplied through a valve 67 and high pressure pump 69 to the inlet end 71 of the high pressure pipe 13. This working fluid is heated through direct absorption of the solar energy reflecting throughout the interior volume of the pipes 11 and 13, but is preferably not vaporized within the pipes 11, 13. Rather, the pressure supplied by the pump 69 is sufficient to permit substantial heating of the working fluid without vaporization. In an exemplary installation wherein the working fluid is water, the pressure and temperature maintained within the high pressure pipes 11, 13 is 665 PSI and 500° F. Under these conditions, substantial energy may be stored within the high pressure pipes 11, 13 themselves. Thus, for example, in this same exemplary system wherein the diameter of the primary mirror 31 is 20 meters, the system is designed to produce 300 kw of thermal power. The pipes 11, 13 have a combined length of approximately 30 meters, a diameter of 20 in., and thus the capacity to store $1.6 \times 10^7$ BTU of thermal energy. This substantial storage capacity permits the solar energy system to store thermal energy during peak solar energy hours and to liberate this energy during hours of total or partial darkness. It will be noted that, contrary to the storage systems used in the prior art, the storage of energy in the present system is in the working fluid itself, so that no intermediary heat transfer is required. The present system permits an extremely dense storage of energy so that the entire system may be installed on site without substantial subsurface storage. In addition, the use of caustic chemicals for heat storage is avoided, so that both the safety and life expectancy of the system is enhanced.

From this brief description in reference to FIG. 1, it will be recognized that the cavity formed by the high pressure pipes 11, 13 performs, in essence, the function of a black body collection cavity. This is accomplished by maintaining the energy entrance port defined by the toroidal lens structure 15 relatively small in comparison with the volume of the high pressure pipes 11, 13. The difference between this black body absorption system and those of the prior art, however, is the use of the reflective surface on the inside of the cavity defined by the high pressure pipes, 11, 13, which forces the solar radiation to be directly absorbed by the working medium rather than by an intermediary plate or heat exchanger. This direct absorption substantially increases the efficiency of the system without detracting from the black body absorption characteristics of the device. In addition, those skilled in the art will recognize the fact that, through the use of the toroidal lens structure 15 and a shutter to be explained in detail below, any energy which would escape from the system must be directed back through the cassegrain mirror system at the sun. Since the effective solar temperature always exceeds the temperature within the black body system, no energy can be redirected at the sun and the system becomes totally absorptive, with the exception of minor convection losses from the pipes 11 and 13 to the atmosphere, which losses can be effectively controlled through insulation as described in detail below. The overall system thus effectively converts solar energy at an efficiency of approximately 90%, ten times the efficiency of typical prior art solar collectors.

From the foregoing discussion and the exemplary embodiment described and depicted in the drawings it will be apparent that a central feature of the invention resides in the adaption of the black body cavity principle in a way not previously contemplated. The classic black body cavity, e.g., as conceived by Lummer and Pringsheim, ideally absorbs all radiation which enters and radiates none. Of course, there is some radiation in practice but a hollow body in which the entry window is a small fraction of the total interior wall area will act as an effective black body cavity with negligible or insubstantial loss. Whether or not a given cavity acts as a black body cavity may be determined by known scientific principles, e.g., by measuring the radiation at the opening with a given body temperature. Thus, scientifically, a black body is an ascertainable structure and it is sufficient definition simply to call the cavity of the present invention a black body cavity absorber, thus incorporating the classical criteria for black body cavity structures.

In a prototype embodiment of the black body cavity of the present invention, the cavity was a cylindrical tube four inches in diameter and ten feet long. The window for receiving concentrated solar radiant energy into the cavity was three inches in diameter. The opaque wall area of the cavity was approximately 200 times the area of the window and the longest dimension of the cavity was approximately 40 times the diameter of the window. In practice, of course, considerable design variation is possible within the criteria for a black body cavity, including variation in shape, as well as size, of the cavity. A spherical cavity, for example, could not accomodate as large a window as an elongate cavity. In general, a window diameter of less than one tenth or less the maximum linear dimension of the cavity, and preferably no greater than one twentieth the maximum cavity linear dimension is required for the cavity to perform as a black body. In area terms, the opaque wall area should be at least about seventy times the window area, preferably at least one hundred times the window area, and, for optimum efficiency, in the general range of about 200 or more times the diameter of the window. The overriding criterion, of course, is that the cavity be so configured and arranged, in respect to size, shape and dimension and wall-to-window ratio as to act effectively as a black box absorption cavity for incident solar radiant energy.

In this respect, it is recognized that Goddard, U.S. Pat. No. 1,969,839, sought to bring about absorption in a fluid in a chamber. Goddard, however, did not contemplate a black body cavity. Goddard's device is inherently limited to comparatively low temperatures because, as will be apparent from the placement of the window at the largest lateral dimension of the cavity. At temperatures where emissivity of the medium is significant, there would be extremely large losses through the window. The placement of the large window at the large end of a funnel-shaped chamber, as in Goddard, is antithetical to the present black body cavity concept.

In summary, then, the absorbing cavity is so configured and arranged as to act, in basic principle, as a black body cavity absorber. The radiant energy which is concentrated and focused into the cavity is retained in the cavity and ultimately absorbed in the fluid in the cavity, either on the first pass through the cavity or on one of the multiple reflected passes through the cavity, in either case being directly absorbed by the fluid. In the classical black body cavity, absorption occurs primarily at the walls of the cavity. In the present instance, however, the absorption preferably occurs primarily by the fluid as the radiant energy traverses the cavity. Any energy absorbed by the walls, however, immediately is conducted to the fluid; hence, at steady state, there is essentially no net absorption of energy by the walls.

The cavity may be of any shape, but the relationship of the cavity size and shape must be such that the cavity acts as a black body absorber. In general, the effective diameter of the window, i.e., the diameter of a circular window which would transmit the same amount of radiation as is transmitted by the window in the cavity, must be a small fraction of the largest linear dimension of the cavity as in classical black body cavities, thereby presenting to the incident radiation essentially all opaque walls, with less than about one percent, and preferably less than about one tenth of one percent, of the incident radiation being re-radiated out the window.

Fluid is, in the preferred form, pumped through the cavity under such conditions as to maintain the fluid at liquid density. In low pressure systems, a simple pump is all that is required. In high pressure systems wherein highest efficiency is achieved, the fluid is maintained under high pressure sufficient to keep the fluid at essentially liquid density, e.g., at the critical point of the liquid, even though the fluid may behave as a gas when allowed to expand. The most effective absorption occurs when the body of fluid in the cavity is at liquid density. Localized pockets of vapor, and other minor losses, such as heat leakage through the walls, etc., may, of course, occur without altering the mode of operation. Water is the preferred fluid, but any other transparent or translucent fluid may be used, if temperatures other than conventional steam operating temperatures are desired or if special phase change temperatures, heat capacities, absorption characteristics or other characteristics are desired. Heat from the absorption fluid may, in a less preferred mode, be extracted by heat exchange in the cavity, but this is less efficient than flowing the fluid through the cavity.

Figure 2:
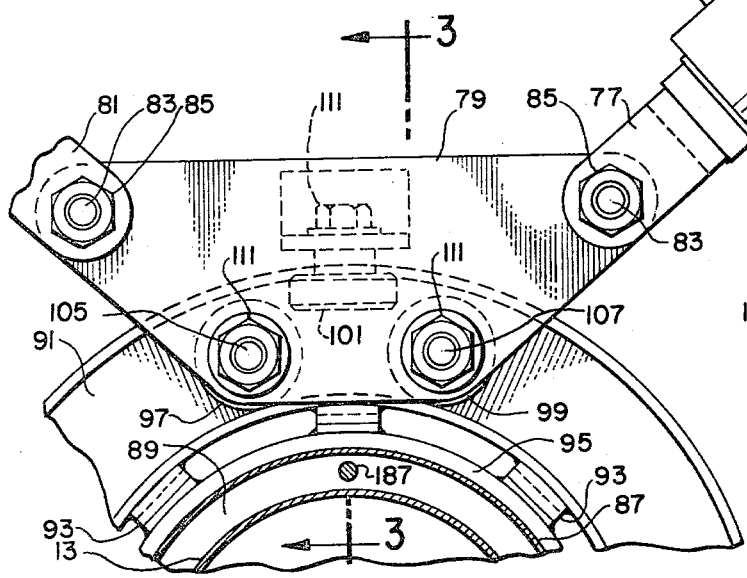
FIG. 2 is a sectional view showing the mirror support system taken along lines 2—2 of FIG. 1.
Figure 3:
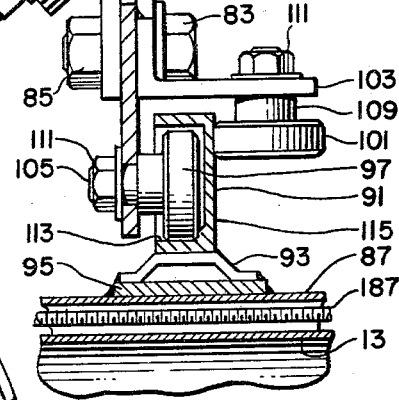
FIG. 3 is a sectional view further detailing the mirror support system of FIG. 2 and taken along lines 3—3 of FIG. 2.

Turning now to the detailed aspects of construction, FIGS. 2 and 3 show a rotating support system used for supporting the actuators 47 on the high pressure pipe 13. Each actuator 47 is a double-acting hydraulic cylinder having first and second hydraulic input lines 73 and 75 (FIG. 1). The actuator 47 is mounted by means of a mounting lug 77 onto a support plate 79. A second mounting lug 81 mounts the second hydraulic actuator 47 (not shown), the pair of hydraulic actuators forming a cradle for one side of the primary mirror 31 and attached thereto at spaced support flanges 53 (FIG. 1). The mounting lugs 77 and 81 are rigidly clamped to the support plate 79 by bolts 83 and nuts 85 so that the hydraulic cylinders 47 and mounting plate 79 form a rigid cradle structure for one side of the primary mirror 31. An identical support plate and mounting structure is used for the pair of hydraulic cylinders 45 (FIG. 1) at the other side of the primary mirror 31 to support and cradle that side of the primary mirror 31 at support flanges 57 (FIG. 1) from the high pressure pipe 11, so that the entire weight of the cassegrain mirror system is supported from the high pressure pipes 11, 13 at the support flanges 53 and 57 (FIG. 1) through the hydraulic actuators 45 and 47.

While the mounting plate 79 bears the weight of the cassegrain mirror system, it is designed to freely rotate about the high pressure pipe 13. This high pressure pipe 13 is surrounded by a coaxial pipe 87 of larger diameter. The pipe 13 defines the walls of the high pressure reflective cavity, while the pipe 87 defines an evacuation chamber 89 between the pipes. The chamber 89 is evacuated, and the inside walls thereof made reflective to thermally insulate the high pressure pipe 13 from the outside atmosphere. This insulation is preferably further increased by making the outside walls of pipe 13 reflective. Thus both the inner and outer walls of the high pressure pipes 11, 13, as well as the inner wall of the pipe 87 are made reflective, the inner reflective wall of the pipes 11, 13 used to form a reflective black body cavity and the remaining reflective walls used for assisting the insulation of that cavity. By evacuating the space 89, the high pressure pipes 11 and 13 become, in effect, a high pressure dewar for storing energy which has been converted by the system.

The support plate 79 is guided to move in an arcuate path along an arcuate rail 91 which is supported, as by brackets 93 and a reinforcing ring 95, to the pipe 87. The arcuate guide rail 91 is formed as a C-channel in which a pair of rollers 97 and 99 are guided. A third roller 101 is mounted to an L-shaped bracket 103 which is attached, as by welding, to the support bracket 79. Each of the rollers 97, 99, 101 is mounted on the support plate 79 or bracket 103 by a bearing mounted on screws 105, 107 and 109, respectively, clamped in place by nuts 111. The rollers 97 and 99 bear against the inside surface 113 of the lower leg of the arcuate C-channel 91 while the roller 101 bears against the outer surface 115 of the channel 91 to maintain the rollers 97 and 99 positioned within the opening of the C-channel 91. It can be seen that the support plate 79, along with the actuators 47 and the cassegrain mirror system, are thus guided for rotational movement around the axis of the pipes 11 and 13 for diurnal movement. An identical mounting system 117 (FIG. 1) is used for guiding the actuators 45 for rotary motion about an identical axis. Thus, the pipe 87 is used to support the cassegrain mirror system, including the primary mirror 31 and secondary mirror 33, for rotation about the axis of the pipes 11, 13, guided by the rail 91.

The actuators 45, 47 may be, for example, hydraulic actuators which are connected by means of lines 73 and 75 to a control system which supplies hydraulic fluid to tilt the cassegrain mirror system about an axis perpendicular to the pipes 11, 13 and passing through the toroidal lens structure 15 to account for seasonal variations in the relative position of the sun and earth. Rotation about this axis is facilitated by the use of struts 49 and 51 (FIG. 1) which are connected to a pivot point coincident with the toroidal lens 15, as will be described in more detail below, which axis defines the center of rotation of the cassegrain mirror structure when the actuators 45 and 47 are energized.

Figure 4:
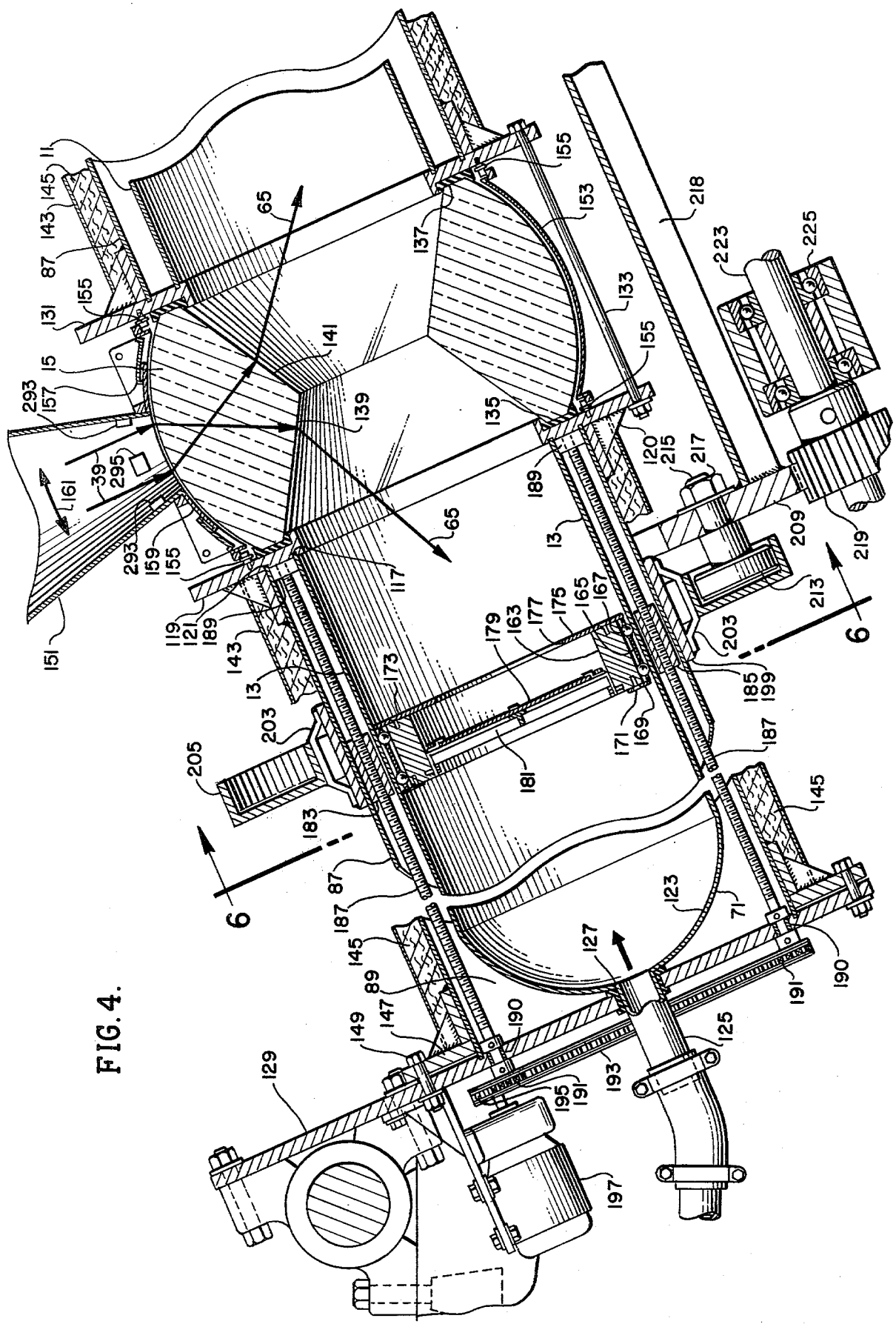
FIG. 4 is a sectional view of the inlet end and central portion of the high pressure pipe of the system of FIG. 1 enlarged to show the details thereof.

Referring now to FIG. 4, the detailed construction of the high pressure pipes 11 and 13, the toroidal lens structure 15 and the surrounding pipe 87 will be explained. The toroidal lens 15 forms, in effect, a bulged cylindrical section of fused quartz interconnecting the high pressure pipes 11 and 13. Radiant energy 39 concentrated by the cassegrain mirror system enters one face of the lens 15 and is refracted, as shown at 65, to propagate along the length of the high pressure pipes 11, 13. This energy, due to the highly reflective inner surfaces of the high pressure pipes 11, 13 will be reflected repeatedly from the inside walls of the black body cavity until it has passed a sufficient distance through the transparent or translucent working medium to be totally absorbed thereby, thus directly heating the working fluid. Since the entire inside of the cavity formed by the high pressure pipes 11, 13 is reflective, the working fluid will achieve a uniform increasing temperature throughout, the entire cavity being uniformly illuminated by the incident collected radiation and by reradiation from the fluid and walls.

The high pressure pipe 13 is open at one end 117 facing the toroidal lens 15 and is mounted at this open end in an annular mounting plate 119. The mounting plate 119 may be grooved to receive the open end of the pipe 13 and may be welded thereto to insure the pressure integrity of the vessel. The outer pipe 87 includes a similar open end 121 which is likewise attached, as by welding, to the annular support plate 119. This attachment may be strengthened by plural reinforcing webs 120, which webs 120 also serve to rigidify the mounting plate 119. The other end 71 of the high pressure pipe 13 is closed, as by a hemispherical end cap 123 welded to the end of the pipe 13. The hemispherical end cap 123 includes an opening which is attached to an inlet pipe 125 and mounted by means of this inlet pipe 125 and a vacuum gasket 127 to an end support plate 129. The remaining open end of the outer pipe 87 is also attached to the end support plate 129 concentric with the pipe 125. The pipes 13 and 87 are thus concentrically mounted between the plates 19 and 129 to form a dewar housing for the black body cavity, the space 89 between the pipes being evacuated to insulate the pipe 13.

A support plate 131 identical to the support plate 119 is positioned on the other face of the toroidal lens 15, and the pair of support plates 119 and 131 is clamped to the lens 15 by a plurality of bolts 133. Annular gaskets 135 and 137 may be used to seal the lens 15 to the plates 119 and 131, these gaskets 135, 137 compressed between the elements by the bolts 133. This entire structure thus forms a rigid cavity formed by the pipes 11, 13, plate 119, 131 and lens 15, the lens 15 having substantial structural strength to resist the extreme pressures within the cavity.

It will be noted that, in addition to the bulged outer surface of the lens 15, the inner diameter of the lens 15 includes a pair of intersecting, coaxial, truncated conical surfaces 139 and 141 which form a second refractive surface to assist in refracting the incident radiation to a path approximately coincident with the axis of the pipes 11, 13.

A third relatively lightweight cylindrical enclosure 143 may be used to surround the pipe 87 and to support therebetween a layer of thermal insulation 145 which reduces the thermal convection losses of the system. The pipe 87 may be attached to the end plate 129, if desired, by an L-shaped annular bracket 147 and plural bolts 149, so that the end plate may be made removable from the system to allow access to the evacuated cavity 89.

As previously explained, the entire cassegrain mirror system is rotated about an axis coincident with the center of the lens 15 and perpendicular to the axis of the pipes 11, 13 to accommodate seasonal changes in the relative position of the sun and the earth. As shown in FIGS. 1 and 4, a conical-shaped tube 151 interconnects the opening 41 in the primary mirror 31 to a shutter system adjacent the toroidal lens 15. This tube 151 is used to exclude foreign objects from the area of intense radiation between the aperture 41 and the lens 15.

The shutter system completely surrounds the outside of the toroidal lens 15 and includes a reflective inside surface to eliminate to the greatest extent possible the loss of solar radiation through this lens 15. The shutter is formed as a bulged cylindrical sleeve 153 mounted at its open ends on a plurality of rollers 155 so that the shutter 153 may rotate about the diurnal axis during daily movement of the lens system about the pipes 11, 13. One side of the shutter 153 includes an opening 157 which cooperates with an overlapping flange 159 extending from the lower extremity of the conical tube 151. As can be seen from FIG. 4, as the cassegrain mirror system and its attached tube 151 rotate in the direction indicated by the arrow 161, the flange 159 will move beneath the opening 157 of the shutter 153 to permit seasonal adjustments, while at the same time maintaining a reflective surface surrounding the lens 15 over the greatest surface area possible. The inner surface of the shutter 153, as well as the flange 159, are made highly reflective so that any energy which is directed toward the shutter system will be reflected. Thus, the only aperture for escape of radiant energy is through the conical tube 151 which, as explained previously, requires a radiation directly at the solar source, which is impossible. Since the entire shutter system, including the shutter 153, flange 159, and tube 151 are rotated by movement of the primary mirror 31, the shutter rotating on the rollers 155, the aperture 157 remains directed toward the axis of the cassegrain mirror and system at all times.

Apparatus is included within this system to change the effective size of the black body cavity bounded by reflective surfaces. This apparatus is best understood through a reference to both FIGS. 4 and 6 and includes a cylindrical ferrous member 163, the outer diameter of which is slightly smaller than the inner diameter of the pipe 13. Between these diameters is positioned a ball bearing structure including a bearing spacer ring 165 and plural balls 167. The bearing spacer ring 165 is maintained in position between the ferrous cylinder 163 and the pipe 13 by a first plurality of positioning plates 169 which are attached to the ferrous member 163 by plural screws 171, and a second annular positioning ring 173 which is similarly attached. The ring 173 has a highly reflective outer surface 175 and includes a central aperture 177 which is smaller than the inside diameter of the ferrous cylindrical member 163, the ring 173 forming a mirror which extends from a position adjacent the inside diameter of the pipes 13 to the aperture 177.

A second flat mirror 179 is mounted, as by a spider member 181 which is attached to the inside diameter of the ferrous member 163. The outer diameter of the circular mirror 179 is larger than the diameter of the aperture 177 so that the pair of mirrored elements 173 and 179 form a flat mirrored end for the pipe 13. A space exists between the mirror 179 and the inside diameter of the ferrous cylindrical member 163 to permit the flow of working fluid around the outside of the mirror 179. Since fluid is allowed to freely flow around the mirror 179, no pressure diferrential exists across this element and, regardless of the pressure within the pipe 13, the entire mirror assembly is free to roll on the ball bearings 167 along the axis of the pipe 13.

Movement of this flat mirror assembly is accomplished by moving a pair of annular permanent magnet segments 183 and 185, each of which is mounted on and threaded to a pair of threaded rods 187. Each of the rods 187 is mounted for rotation in a first end bearing 189 mounted on the support plate 119 and a second bearing 190 mounted within apertures within the end support plate 129. The threaded members 187 extend beyond the end plate 129 to support sprockets 191 which are each engaged by a chain 193. The chain 193 is additionally engaged by a sprocket 195 attached to the rotor of an electrical motor 197. The electrical motor 197 thus serves to rotate each of the four threaded rods 187 in the same direction, these rods in turn threading along the magnet segments 183 and 185 to move the magnet segments along the length of the pipe 13. The magnetic force between these segments 183, 185 and the ferrous element 163 is used to draw the flat mirror structure along with the moving magnet sections 183, 185. A rotation of the motor 197 thus moves the flat mirror partition, including the mirrors 173 and 179, along the length of the pipe 13 to change the effective size of the black body cavity 11, 13. Since only the magnetic force of the magnets 183 and 185 traverses the high pressure pipe 13, the pressure integrity of the pipe is not affected through a system of this type. Numerous alternate methods for moving the magnet segments 183, 185, such as linear motors, may be used, but in each instance the magnets are preferably positioned between the pipes 13 and 87 to remotely move the flat mirror structure.

With the flat mirror structure, including the mirrors 173 and 179, adjacent the toroidal lens 15, the black body cavity in which elevated constant temperatures are maintained by solar radiation is limited to the area between the flat mirror 173, 197 and the upper end of the high pressure pipe 11. As will be explained in more detail below, as the pressure or temperature within the black body cavity increases, the storage capacity of the system may be adjusted by moving the flat mirror 173, 179 toward the inlet 125 of the pipe 13, effectively doubling the black body cavity volume when the flat mirror 173, 179 reaches its other extreme. In operation, the flat mirror 173, 179 is positioned adjacent the toroidal lens 15 in the morning, before dawn. When the sun rises above the horizon and heats the working fluid within the cavity to a predetermined temperature, the motor 197, under control of a temperature sensor and servo system, operates to move the flat mirror 173, 177 along the axis of the pipe 13, enlarging the volume of the solar collection cavity. It will be appreciated that, while no pressure differential exists across the flat mirror 173, 179, a substantial thermal gradient exists at this point in the system since the fluid upstream of the flat mirror 135, 179 is not subjected to solar radiation and is therefore relatively cool in comparison with the high temperature fluid within the mirrored walls of the adjustable sized cavity. Some thermal convection may occur through the spaces around the flat mirror 179 to heat the inlet water, but it is assumed that, under normal operating conditions, there is a continuous flow of working fluid through the inlet 125, limiting the convection upstream through the spaces around this mirror 179.

Referring now to FIGS. 4, 5, 6 and 8, the mechanism for supporting the struts 49 and 51 of FIG. 1 and for controlling diurnal rotation of the cassegrain mirror system will be explained. A pair of reinforcing rings 199 and 201 encircle the pipe 87 at locations adjacent the toroidal lens 15. These rings 199, 201 are attached to the pipe 87 through plural circumferentially spaced brackets 203, and are attached to support a pair of facing, annular C-channels 205 and 207. The C-channels 205 and 207 are, in turn, attached, as through brackets 208 (FIG. 6) to the mounting struts 23 and 25 mentioned in reference to FIG. 1. The mounting struts 23 and 25 thus directly support the C-channels 205 and 207 from the foundation pad 17 and, through the brackets 203, serve to support the central portion of the high pressure pipes 11, 13 so that undue strain is not placed on the toroidal lens 15 by the weight of the cassegrain mirror system.

A pair of hemispherical gear segments 209 and 211 are supported for movement along the C-channels 205 and 207 through plural rollers 213. Each of the rollers 213 is mounted by a bolt 215 and nut 217 to one of the gear segments 209, 211 for rotation. The gear segments 209, 211 are interconnected by plural channel members 218, attached thereto, as by welding, to form an integral structure. Thus, the entire structure, including the gear segments 209, 211 and channel members 218 is free to rotate about the axis of the high pressure pipes 11, 13 through movement of the rollers 213 within the channels 205 and 207. The gear segments 209 and 211 engage with spur gears 219 and 221, respectively, these gears mounted on a common shaft 223 which is rotationally mounted in bearing pillow blocks 225 and 227 from a stationary support structure 229. The shaft 223 is attached to a sprocket 231 engaged with a chain 233 which is driven by a sprocket 235 attached to the rotor of the motor 59 through the gear box 61. The motor 59 is preferably a synchronous, clock-type motor which, through the gear box 61 drives the gear segments 209 and 211 at a rate equivalent to the rate of rotation of the earth.

An opposing pair of the channel members 218 support a pair of coaxial axles 241 extending outwardly from these channels 218. Mounted, as by bearings 243, to these axles 241 are a pair of support plates 245, one on either side of the lens 15, which are in turn rigidly attached to the struts 49 and 51 as through bolts 247 and 249. It will be appreciated that a pair of struts 49, 51 is thus attached on either side of the lens 15, and these struts are, in turn, attached to support flanges 53, 57 (FIG. 1) located at spaced locations on the primary mirror 31. The axles 241 thus provide a rotational axis for the entire cassegrain mirror system about the center of the toroidal lens 15, the movement introduced by the actuators 45 and 47 (FIG. 1) thus confined to a rotation about this axis 241. It will be appreciated that this axis is directly supported through the supports 19, 21, 23, 25 from the concrete foundation 17 so that the weight of the mirror system is not directly borne at the center of the black body cavity formed by the pipes 11 and 13. As the clock motor 59 drives its sprocket 235, the entire assembly, including the gear segments 209 and 211, the channel members 218, and the attached axles 241 rotate in accordance with the diurnal rotation of the earth, inducing a rotation through the members 49 and 51 in the cassegrain mirror system, causing this mirror system to follow the relative motion of the sun and earth.

As best shown in FIGS. 1, 4, 7 and 8, the primary mounting for the solar energy conversation system of the present invention is preferably accomplished through the end plate 129 attached to the inlet end of the system and a similar end plate 247 mounted in identical fashion, though inverted, to the outlet or upper end of the high pressure pipe 11, as shown in FIG. 7. These end plates 129, 247 are supported on the concrete pylons 27 and 29, respectively. As previously explained, it has been found advantageous to mount the system so that the axis of the high pressure pipes 11 and 13 is parallel to the earth's axis at the location where the system is installed. In order to facilitate such installation, as particularly shown in FIG. 8, the end plates 129, 247 may be attached to pillow blocks 249 and 151, respectively, and thereby rotationally mounted on a pair of axles 253 and 255, respectively. The axles 253 and 255 are, in turn, supported by pairs of pillow blocks 257 and 259, respectively, which are attached to the top of the concrete pylons 27 and 29. Through the use of this rotational mounting, the height of the concrete pylons 27 and 29, as well as their spacing, may be specified by the manufacturer for a particular site. The concrete pylons may then be poured to the desired height so that the system may be directly installed thereon by attachment of the pillow blocks 257 and 259 to the concrete pylon. If the installation is carried out properly, the axis of the cassegrain mirror system, when properly tracking relative solar movement, will be perpendicular to the axis of the pipes 11, 13 at equinox and will vary therefrom to accommodate seasonal changes through actuation of the actuators 45 and 47.

As shown in FIG. 7, the mounting of the upper end of the high pressure pipe 11 is substantially identical to the mounting of the lower end of the high pressure pipe 13. The high pressure pipe 11 includes a hemispherical end cap 261 which is connected to an outlet pipe 263, which outlet pipe 263 is mounted through vacuum gasket 265 to the end plate 247. The outer pipe 87 is connected by an L-shaped annular flange bracket 267 welded thereon to the end plate 247 by a series of bolts 269, and the outer insulation supporting jacket 143 may be mounted to the bracket 267 as well.

Figure 9:
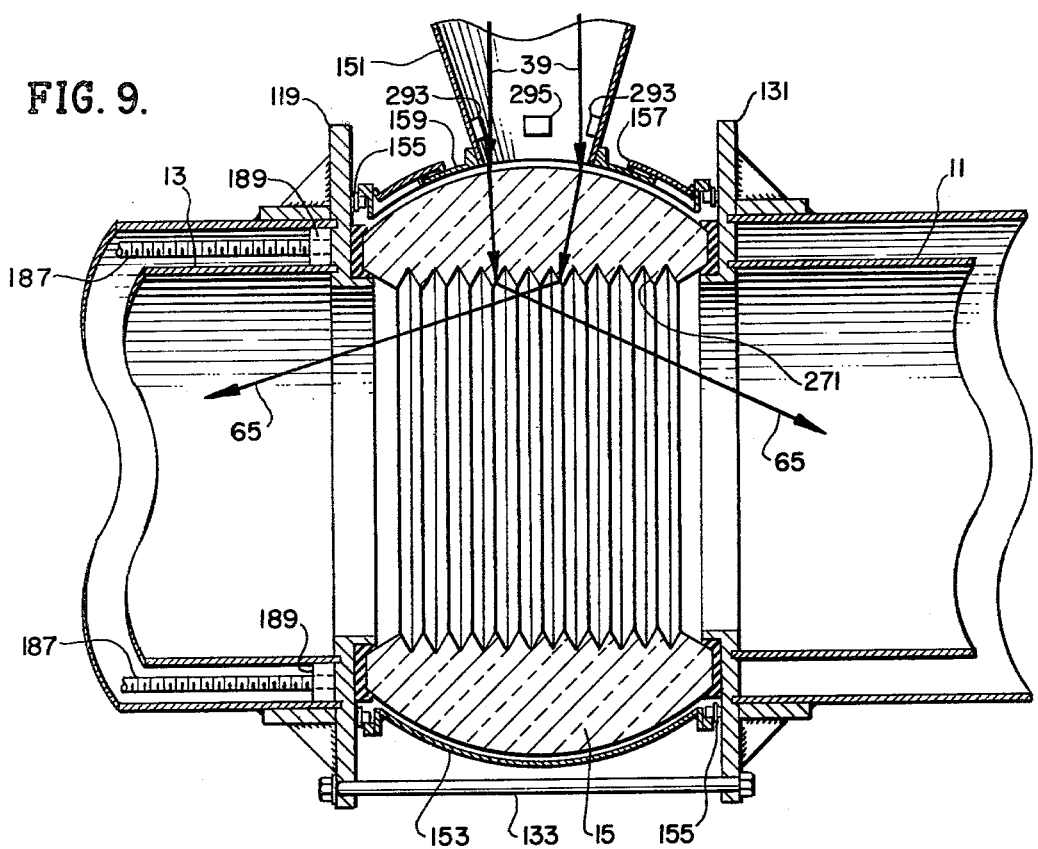
FIG. 9 is a sectional view of the central portion of the high pressure pipe, enlarged to show the details thereof, similar to the central pipe portion of FIG. 4, but showing an alternate embodiment of the toroidal lens structure thereof.

Referring now to FIG. 9, an alternate embodiment of the toroidal lens 15 will be described. In this embodiment, the entire structure is identical to that described in reference to FIG. 4, except that the inner diameter of the lens 15, rather than including intersecting truncated conical refracting surfaces, includes a cylindrical inner wall, ruled or grooved to form a Fresnel lens 271. This lens 271 operates in a manner substantially identical to the lens structure of FIG. 4, refracting incident radiation 39 to bend the solar radiation to a direction more closely aligned with the axis of the high pressure pipes 11, 13 as shown at 65. It will be recognized by those skilled in the art that the Fresnel lens of FIG. 9 is the optical equivalent of the lens structure of FIG. 4.

Figure 10:
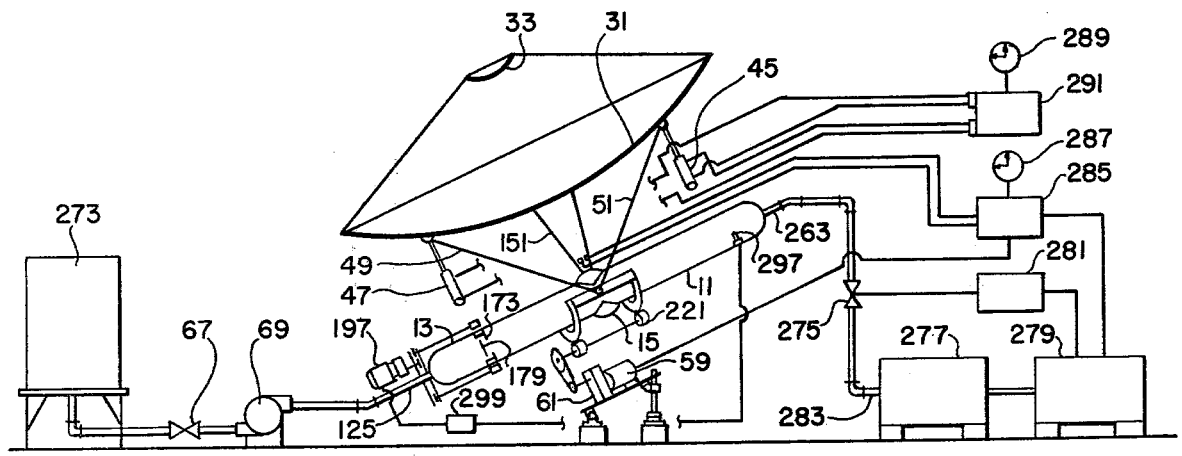
FIG. 10 is a schematic illustration showing the interconnection of the solar conversion system of FIG. 1 with a steam turbine electrical generating facility for producing electrical power.

Referring now to FIG. 10, a typical overall system installation utilizing the conversion device of the present invention will be described. As previously explained, solar radiation incident on the primary mirror 31 is reflected from the secondary mirror 33 to enter the optical cavity defined by the small opening provided in the shutter 153 surrounding the lens 15. This solar energy is repeatedly reflected from the reflective inner surfaces of the optical cavity defined by the inner walls of the pipes 11 and 13 and a movable flat mirror structure including the mirrors 173 and 179. At all times during operation of this system, the entire volume of the pipes 11, 13 is filled with fluid, the density of which is equal to the liquid density of the working medium. Thus, once the triple point has been exceeded, the fluid within the optical cavity will have the properties of a gas, but will nevertheless have the density of liquid since a sufficiently high pressure is maintained on the system to maintain this density. For the purpose of the remainder of this description, the fluid within the black body cavity will be referred to, therefore, as a liquid, regardless of its temperature. Water is supplied from a reservoir 273 through a manual control valve 67 and high pressure pump 69 to the inlet pipe 125 of the pipe 13. The pump 69 may be designed to maintain a given pressure head within the system and this pressure head will be selected to maintain the density of the working fluid within the system equal to the liquid density of the fluid. Fluid pumped into the system will pass through the flat mirror 173, 179 to enter the black body cavity and be heated through direct absorption of solar energy. The extremely high temperature, high pressure liquid resulting from this absorption is conducted by means of the outlet pipe 263 through an automatically controlled valve 275 to a steam turbine 277 used to drive, for example, an electrical generator 279. The rotational rate of the turbine 277 and generator 279 may be controlled, for example, by an electronic control system 281 used to regulate the valve 275. It will be understood that a pressure differential exists across the valve 275, such that a much lower pressure exists at the inlet 283 of the turbine 277 than within the black body cavity, so that the liquid immediately vaporizes to produce a high volume, high pressure vapor source for driving the turbine 277. It will likewise be recognized that the exhaust steam or other gas from the turbine 277 may be exhausted to atmosphere or may be condensed to supply water to the reservoir 273.

The clockwork motor 59, which through the gear box 61 drives the cassegrain mirror system about the diurnal axis on a daily basis, is typically energized from an electronic motor control system 285 which may be connected, for example, to the generator 279 as a source of power and which operates in response to signals produced by an electronic clock 287.

A similar electronic clock 289 and hydraulic control system 291 responsive thereto may be utilized to drive the actuators 45 and 47 to adjust the relative axes of the pipes 11, 13 and cassegrain mirror system 31, 33 for seasonal variations in the direction of the earth's axis relative the position of the sun.

As is well known, the relative movement of the earth and sun is extremely predictable and the motor control 285 and hydraulic control 291 will, in substantially all instances, effectively direct the axis of the cassegrain mirror system 31, 33 to assure that the focused solar energy will be applied to the aperture in the shutter 153 and thus to the black body cavity. As a backup system, however, optical sensors 293 and 295, shown in FIGS. 4 and 9, may be utilized to produce error signals for the hydraulic actuator 291 and motor control 285, respectively. If the focused solar energy is not centrally located within the small end of the conical tube 151 used to mount the sensors 293 and 295, an imbalance will occur between oppositely located sensor pair 293 or a similar oppositely located pair of sensors 295. The oppositely located sensors 293 may thus be used to produce a differential error signal for the hydraulic actuator 291, and may override the clock signals 289 to adjust for errors produced thereby. Similarly, the sensors 295, differentially operated, may produce error signals to adjust the motor control system 285 in the event of error signals from the clock 287.

The system thus far described is an extremely efficient solar energy conversion apparatus which may be mounted at various locations on the surface of the earth through a simple support structure, and which adjusts for both diurnal and seasonal variations in the relative position of the sun and earth while always maintaining the focal point of the cassegrain mirror system 31, 33 at a single location on a stationary cavity 11, 13. The maintenance of a stationary cavity such as that shown is extremely beneficial, in that no rotating or moving seals are required which would increase system expense, since such seals would be required to withstand the extreme pressures and temperatures expected in this installation. Thus all diurnal motion of the cassegrain mirror system 31, 33 is about a single axis, permitting the toroidal lens 15, although located in a stationary position, to refract all incident energy along the length of the high pressure pipes 11, 13. In addition, the use of direct absorption of this solar energy by the transparent or translucent fluid medium itself is extremely efficient, no intermediary absorption plate or heat exchangers being required for the absorption of energy. By maintaining the optical aperture extremely small, no energy is permitted to reradiate from the system, since such radiation would require a radiation back toward the sun which would violate the first law of thermodynamics. Furthermore, by maintaining convection losses at a minimum through a dewar-type construction and other insulating techniques, the energy absorption efficiency of this system may be maintained at an extremely high level. In addition, the system operates as a means of storing the energy thus absorbed, both efficiently and without the use of heat exchangers or dangerous materials, the inventor having found that the high pressure, high temperature working fluid itself may be utilized to store large amounts of energy for use during periods of total or partial darkness. Since the movable flat mirror 173, 179 effectively varies the size of the black body cavity to control the temperature within the cavity, the cavity size may be made larger when high levels of solar energy are available. In this respect, FIG. 10 shows a temperature sensing probe 297 connected to a motor control system 299 used to drive the motor 197 for adjusting the position of the flat mirrors 173 and 179. In the morning, when the bulk of the stored energy within the pipes 11, 13 has been utilized, the temperature within the vessel will be relatively low and the motor control system 299, in response to the temperature sensor 297, will have adjusted the flat mirrors 173, 179 to a position adjacent the toroidal lens 15. During the day, as solar energy is absorbed, if more solar energy is absorbed into the fluid within the black body cavity than is required for maintaining operation of the turbine 277 and generator 279, the temperature sensed by the probe 297 will increase, causing the motor control system 299 to move the flat mirrors 173, 179 upstream toward the inlet 125 of the pipe 13, increasing the effective size of the black body cavity and permitting the storage of this additional available energy.

Figure 11:
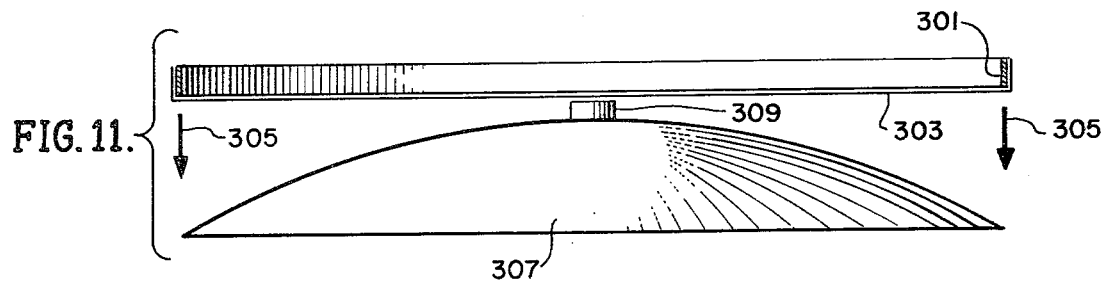
FIGS. 11, 12 and 13 are sectional views of a mold form and portions of the main reflective mirror of the optical system of FIG. 1, showing the successive steps of a method for manufacturing said mirror.

As is recognized by those skilled in the art, the manufacture of a large primary mirror 31 which may be mounted and rotated using systems such as those shown has not heretofore been possible. The present invention therefore includes novel techniques and materials for the manufacture of the primary mirror 31 to provide an extremely rigid, lightweight structure of sufficient optical quality to focus the solar radiation through the toroidal lens 15. This is accomplished using the method outlined in FIGS. 11, 12 and 13. Initially, a large ring 301 may be fabricated by using, for example, corrugated cardboard material impregnated with epoxy to make it rigid. A sheet of aluminized MYLAR 303 is stretched across one face of the ring 301 and attached thereto, as by epoxy. This sheet 303, as viewed in FIG. 11, has an aluminum layer on the top and a MYLAR layer for strength and corrosion resistance on the underside. This material is presently available in mirror-like highly flexible, highly reflective sheets. This assembly of the ring 301 and stretched sheet 303 is pressed, as shown by the arrows 305, over a large male mold 307 formed as a paraboloid and defining the curvature of the primary mirror 31. A cylinder 309 may extend from the central axis of the male mold 307 to provide the aperture 41 for the completed mirror, and the sheet 303 may be cut to pass over the cylindrical form 309.

Figure 12:
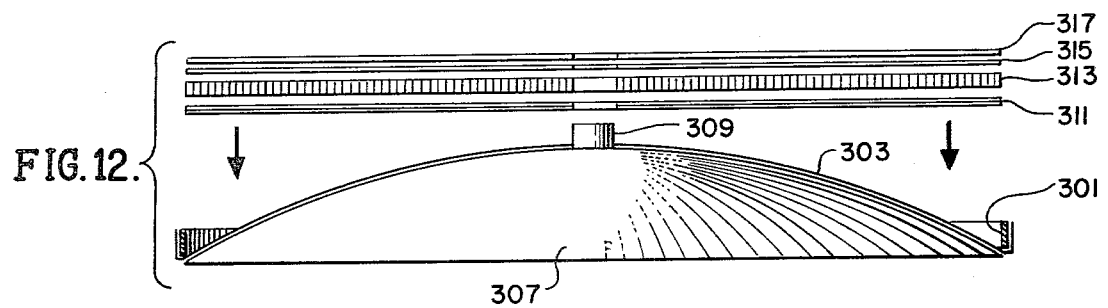
Figure 13:
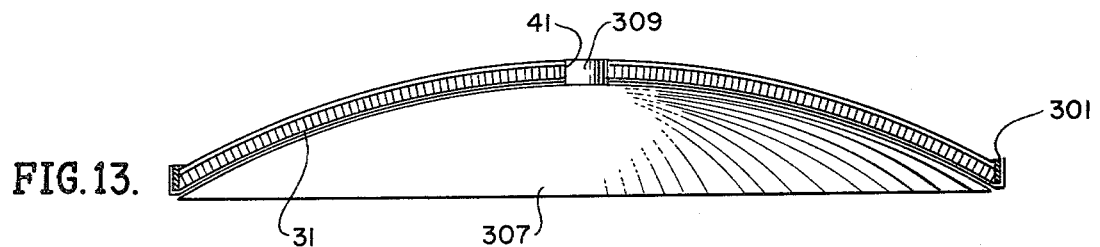

When the ring 301 and its attached sheet 303 are pressed down over the male mold 307, as shown in FIG. 12, the resilience of the sheet 303 will make this sheet conform precisely to the contours of the male mold 307. The ring 301 is held depressed, and a layer of epoxy and glass 311 is applied to the aluminum backing of the aluminized mylar sheet 301. Cardboard honeycomb material 313, with honeycomb axes vertical as viewed in FIG. 12, is then placed over the epoxy and glass layer 311 to conform with the shape of the male mold 311, and the cardboard 313 is coated with epoxy to lend rigidity. A backing layer of epoxy and glass 315 is then applied to seal the open ends of the cardboard honeycomb material 313, and may be epoxied thereto. A final layer of low density foam material 317 is then attached to the epoxy material 315 to complete the assembly. This completed assembly is shown in FIG. 13. Each of the layers 311 through 327 are placed on the sheet 303 to conform with the male mold 307 and are epoxied in place in this configuration, resulting in an extremely rigid, very lightweight structure. Each of the layers 311 through 317 may be apertured to receive the cylindrical extension 309, thus forming the central aperture 41 for the primary mirror 31.

Figure 14:
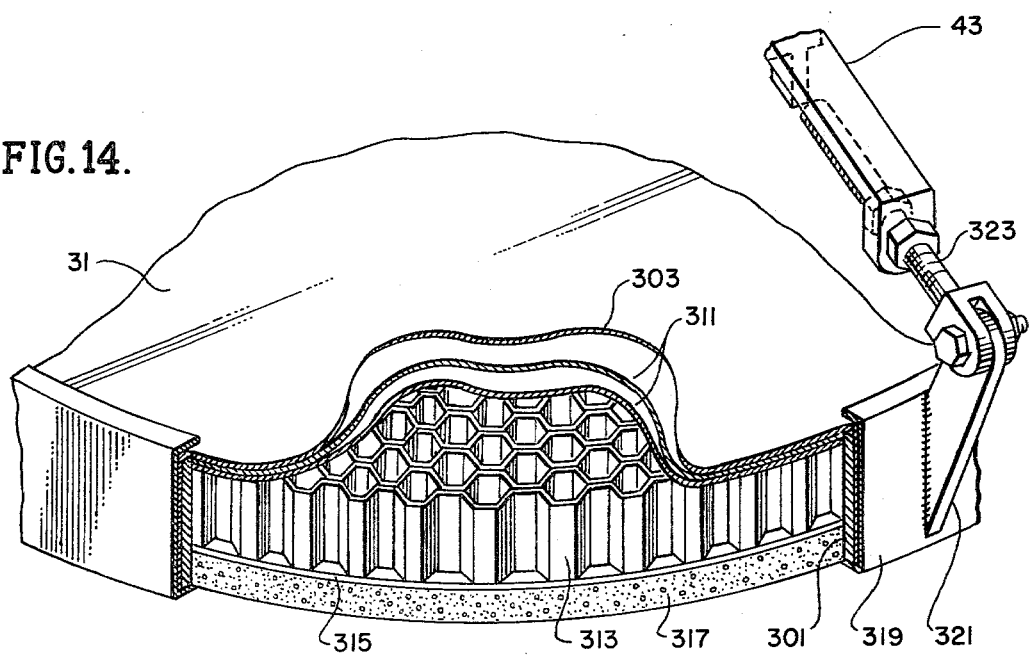
FIG. 14 is a perspective view of one edge of the main reflective mirror of FIG. 1, partially in section, said view showing the details of construction of said mirror.

FIG. 14 shows a perspective view, partially cut away, of the primary mirror 31 with the reflective surface uppermost in this figure. This structure includes an aluminum and mylar layer 303, the mylar layer being uppermost, and epoxy layer 311 attached to the aluminum of the layer 303 as well as the cardboard honeycomb layer 313, a second epoxy layer 315 and the low density foam layer 317. It will be appreciated that each layer is bonded to the next, forming a lightweight sandwich structure having extremely high compression strength. This assembly is surrounded by the original epoxy-impregnated cardboard ring 301 which is bonded to each of the layers, and this ring 301 may, in turn, be surrounded by and bonded to a protective metal ring 319. The ring 319 may be used, through an extension bracket 321, to mount the struts 43 used to support the secondary mirror 31 (FIG. 1). These struts 43 may be made adjustable in length through the use of a turnbuckle connection 323, as shown in FIG. 14, permitting the axes of the mirrors 31 and 33 to be accurately aligned during installation of the system.

The sun subtends approximately 30 arc minutes at the earth and the optical system as described herein is capable of approximately one arc minute of optical quality, which will permit a collection of over 90% of the sun's energy falling on its aperture. At the same time, the primary mirror 31 is relatively inexpensive to manufacture and may be manufactured in extremely large sizes. As an example, the primary mirror 31 of the preferred embodiment may be 20 meters in diameter while still providing sufficient rigidity to maintain the required optical quality, all without excessive weight which would interfere with rotation of the system as required by the relative motion of the sun and earth.

The combination of this unique mirror system with the direct solar absorption apparatus described in reference to FIGS. 1 through 10 permits a relatively low cost, extremely efficient energy absorption and storage system which may be effectively mass produced, shipped and installed in various locations to supply electrical and thermal energy requirements to replace the utilization of fossil fuels. The high efficiency and energy storage of the present system makes it far more practical than prior art solar energy conversion systems which have been developed and provides an extremely practical energy source.

In addition to other changes to the specific structure disclosed which will be apparent to those skilled in the art and which permit the practice of this invention while deviating only from the details, those skilled in the art will realize also that the interior surface of the pipes 11, 13 need not be reflective. So long as the energy is transmitted directly to the interior of the pipes 11, 13, even highly absorptive walls will immediately attain the same temperature as the included fluid such that they will reradiate as much energy as they absorb, the net effect being that the working fluid directly absorbs radiated energy rather than being heated by convection from the container walls.

I claim:

1. Apparatus for converting radiant solar energy, comprising:
    means for focusing said radiant energy; and opaque optically closed black body cavity means containing a transparent or translucent medium and a transparent window positioned near the focal point of said focusing means, the area of said window which admits solar energy to said cavity means being less than one percent of the wall area of said cavity means, said medium directly absorbing substantially all of said focused radiant energy entering said closed cavity means through said window, said cavity including means for repeatedly reflecting said radiant energy from the walls of said cavity to provide repeated transmission of said radiant energy through said medium.

2. Apparatus for converting solar energy as defined in claim 1 wherein said cavity means comprises:
a vessel having reflective inside walls and wherein said transparent window is sealed in said aperture for admitting said focused energy to said vessel.

3. Apparatus for converting solar energy as defined in claim 1 wherein said cavity means is stationary, said apparatus, additionally comprising:
means for adjusting the position of said focusing means to provide a focus for said energy which remains on said window as the relative position of the earth and sun changes.

4. Apparatus for converting solar energy as defined in claim 1, additionally comprising:
means connected to said cavity means for pumping said fluid through said cavity means.

5. Apparatus for converting solar energy as defined in claim 1 wherein said focusing means comprises:
a cassegrain mirror system.

6. Apparatus for converting solar energy as defined in claim 1, additionally comprising:
a container surrounding and spaced from said cavity means, the space between said container and said cavity means being evacuated.

7. Apparatus for converting radiant solar energy, comprising:
means for focusing said radiant energy;
an optically closed black body cavity containing a transparent or translucent medium and a transparent window positioned near the focal point of said focusing means, said medium directly absorbing said focused radiant energy entering said closed vessel through said window, said cavity including means for repeatedly reflecting said radiant energy from the walls of said cavity to provide repeated transmission of said radiant energy through said medium; and
means for adjusting the volume of said optically closed cavity.

8. Apparatus for converting radiant solar energy comprising:
means for focusing said radiant energy;
an optically closed black body cavity containing a transparent or translucent fluid medium, and a transparent window positioned near the focal point of said focusing means, said fluid directly absorbing said focused radiant energy entering said closed vessel through said window, said cavity including means for repeatedly reflecting said radiant energy from the walls of said cavity to provide repeated transmission of said radiant energy through said fluid; and
means for pressurizing said fluid within said cavity to prohibit vaporization thereof.

9. Apparatus for converting radiant solar energy comprising:
means for focusing said radiant energy; and
an optically closed black body cavity containing a transparent or translucent medium, wherein said medium is water, and wherein said cavity forms a high pressure vessel for withstanding pressures required for prohibiting vaporization of said water, and a transparent window positioned near the focal point of said focusing means, said water directly absorbing said focused radiant energy entering said closed vessel through said window, said cavity including means for repeatedly reflecting said radiant energy from the walls of said cavity to provide repeated transmission of said radiant energy through said water.

10. Apparatus for converting solar energy, comprising:
a black body cavity vessel containing a fluid and having means for repeatedly reflecting solar energy from the walls of said cavity;
means utilizing the solar energy incident on an area of predetermined size for heating said fluid within said vessel; and
means permeable to said fluid for adjusting the volume of said vessel.

11. Apparatus for converting solar energy as defined in claim 10 wherein said adjusting means automatically adjusts said volume in response to the temperature of said fluid.

12. Apparatus for converting solar energy as defined in claim 11 wherein said adjusting means automatically maintains said temperature constant.

13. Apparatus for converting solar energy as defined in claim 10 wherein the inside walls of said vessel are reflective and wherein said adjusting means comprises:
a reflective partition mounted within said vessel and movable relative thereto.

14. Apparatus for converting solar energy as defined in claim 13 wherein said adjusting means additionally comprises:
means for automatically moving said reflective partition relative said vessel in response to the temperature of said fluid.

15. Apparatus for converting solar energy as defined in claim 10 wherein said heating means comprises means focusing said solar energy incident on an area of predetermined size.

16. Apparatus for converting solar energy as defined in claim 15 wherein said vessel includes an aperture located at the focus of said focusing means.

17. Apparatus for converting solar energy as defined in claim 16 wherein said vessel is designed to withstand high pressures of said fluid and wherein said aperture is covered by a transparent, pressure resistant element.

18. Apparatus for converting solar energy as defined in claim 10 wherein said heating means heats said fluid through direct absorption of said solar energy by said fluid.

19. A method of converting solar energy comprising:
supplying and withdrawing a working liquid medium to and from an opaque, optically closed black body cavity;
focusing solar energy within said cavity through a window having an area which is less than one percent of the area of said cavity; and
directly absorbing substantially all of said focused energy in said working liquid medium through repeated reflection of said energy from the walls of said cavity and repeated transmission of said energy through said working liquid medium.

20. A method of converting solar energy as defined in claim 19 wherein said focusing step comprises:
reflecting said solar energy from a primary concave mirror having a central aperture;
reflecting said solar energy previously reflected by said primary mirror from a secondary convex mirror toward a focal point through said aperture.

21. A method of converting solar energy as defined in claim 20, additionally comprising:
adjusting the positions of said primary and secondary mirrors to track the relative movement of the sun and earth while maintaining said focal point at a fixed location.

22. A method of converting solar energy comprising:
supplying and withdrawing a liquid to and from an optically closed black body cavity, wherein said supplying step comprises:
pumping said liquid into said cavity at a pressure which maintains said liquid at liquid density, when said cavity is at a temperature above the atmospheric pressure boiling point of said liquid;
focusing solar energy within said cavity; and
directly absorbing said focused energy in said working medium by repeatedly reflecting said solar energy from the walls of said cavity.

23. A method of converting solar energy comprising:
supplying and withdrawing a working medium, said medium being a fluid, to and from an optically closed black body cavity;
focusing solar energy within said cavity;
adjusting the volume of said working fluid directly absorbing said focused energy; and
directly absorbing said focused energy in said working fluid by repeatedly reflecting said solar energy from the walls of said cavity.

24. A method of converting solar energy comprising:
supplying fluid under pressure to a black body cavity vessel;
heating said fluid within said vessel by concentrating the solar energy incident on a predetermined area and focusing said concentrated energy into said vessel and repeatedly reflecting said energy from the walls of said vessel for direct absorption by said fluid within said vessel; and
adjusting the volume of said vessel to adjust the volume of fluid directly absorbing said energy within said vessel.

25. A method of converting solar energy as defined in claim 24 wherein said adjusting step comprises:
adjusting the position of a reflective partition within said vessel.

26. A method of converting solar energy as defined in claim 24 wherein said adjusting step comprises:
monitoring the temperature of said fluid; and
automatically adjusting said volume in response to said temperature.

27. A method of converting solar energy as defined in claim 24 wherein said adjusting step occurs automatically to maintain a constant temperature within said vessel.

28. Apparatus for converting and storing solar energy, comprising:
a black body cavity vessel constructed to withstand high internal pressures;
a liquid filling said vessel;
means utilizing solar energy for storing substantial energy in said liquid by radiatively heating said liquid, said vessel including means for repeatedly reflecting said radiant energy from the walls of said cavity, to a temperature above the atmospheric pressure boiling point thereof to pressurize said liquid, said vessel confining said liquid during heating to maintain the density thereof substantially equal to that of its liquid state; and
means for withdrawing said liquid from said vessel and lowering the pressure thereon to vaporize said liquid and produce physical work in response to the pressurized vapor so produced.

29. Apparatus for converting and storing solar energy as defined in claim 28 wherein said heating means heats said liquid by direct absorption of solar energy by said liquid.

30. Apparatus for converting and storing solar energy as defined in claim 29 wherein said vessel includes an aperture sealed by a transparent cover for admitting solar energy to said vessel.

31. Apparatus for converting and storing solar energy as defined in claim 30 wherein the interior walls of said vessel are highly reflective to facilitate said direct absorption of solar energy.

32. Apparatus for converting and storing solar energy as defined in claim 28 wherein said heating means heats only a portion of the volume of said fluid within said vessel, said apparatus additionally comprising:
means for adjusting the volume of said fluid heated by said heating means.

33. Apparatus for converting and storing solar energy as defined in claim 28 wherein said heating means comprises:
a cassegrain mirror system for focusing solar energy; and
means for rotating said cassegrain mirror system diurnally about its own focus.

34. Apparatus for converting and storing solar energy as defined in claim 33 additionally comprising:
means for rotating said cassegrain mirror system about its own focus to adjust for seasonal changes in the relative positions of the sun and earth.

35. A method of converting and storing solar energy, comprising:
radiatively heating a liquid with solar energy within a black body cavity which includes means for repeatedly reflecting said energy from the walls of said cavity to a temperature exceeding the atmospheric pressure boiling point thereof;
confining said liquid during heating to maintain the density thereof substantially equal to the liquid density thereof to store energy therein; and
lowering the pressure on said liquid to vaporize said liquid and thereby produce large quantities of heated vapor.

36. A method of converting and storing solar energy as defined in claim 35 wherein said heating step comprises:
directly absorbing said solar energy within said liquid.

37. A method of converting and storing solar energy as defined in claim 35, additionally comprising:
adjusting the volume of said confined liquid heated by said solar energy.

38. A method of converting and storing solar energy as defined in claim 37, additionally comprising:

reflecting said solar energy repeatedly through said liquid.

39. Apparatus for collecting, concentrating and converting solar energy, comprising:
a high pressure, opaque black body cavity mounted in a stationary position, said cavity having an aperture, the wall area of said cavity being reflective and being at least 100 times the area of said aperture, said cavity having an inlet and an outlet and filled during use with a transparent or translucent working fluid;
a transparent, pressure resistant window covering said aperture;
a high pressure pump for supplying said working fluid at high pressure to said cavity inlet;
means for converting said high pressure working fluid when heated, to mechanical energy, said converting means connected to said cavity outlet;
means for concentrating solar energy incident on a fixed area and focusing said energy through said aperture and window into said fluid within said opaque cavity for direct absorption by said fluid; and
means for adjusting the position of said concentrating means to maintain the focus thereof at a fixed position coincident with said window while tracking the relative motion of the earth and sun.

40. Apparatus for collecting, concentrating and converting solar energy as defined in claim 39 additionally comprising:
a mirror mounted within said cavity, said mirror apertured to permit said working fluid to flow therethrough, said mirror mounted between said inlet and outlet and separating said cavity into two subcavities, said mirror limiting said direct absorption of solar energy to the working fluid in only one of said subcavities.

41. Apparatus for collecting, concentrating and converting solar energy as defined in claim 40 additionally comprising:
means for adjusting the position of said mirror within said cavity to alter the volume of said one of said subcavities.

42. Apparatus for collecting, concentrating and converting solar energy as defined in claim 41 wherein said mirror position adjustment means comprises:
a first magnetic element mounted on said mirror;
a second magnetic element, mounted outside said cavity, said second magnetic element attracting said first magnetic element to induce motion therein; and
a linear actuator for moving said second magnetic element along the outer surface of said cavity.

43. Apparatus for collecting, concentrating and converting solar energy as defined in claim 42, additionally comprising:
a double-walled vessel defining said cavity, the space between the double walls thereof being evacuated to thermally insulate said cavity.

44. Apparatus for collecting, concentrating and converting solar energy as defined in claim 43 wherein said solar energy concentrating means comprises:
a cassegrain mirror system having an apertured primary mirror and a secondary mirror separated from the focus of said mirror system by said primary mirror aperture.

45. Apparatus for collecting, concentrating and converting solar energy as defined in claim 44 wherein said apertured primary mirror of said cassegrain mirror system comprises:
a reflective concave surface element; and
a honeycomb structure bonded to said concave surface element, the axes of said honeycomb structure being substantially perpendicular to said concave surface.

46. Apparatus for collecting, concentrating and converting solar energy as defined in claim 45 wherein said honeycomb structure is formed of cardboard.

47. Apparatus for collecting, concentrating and converting solar energy as defined in claim 46 wherein said transparent, pressure resistant window comprises:
a lens for refracting said solar energy focused by said cassegrain mirror system into said cavity.

48. Apparatus for collecting, concentrating and converting solar energy as defined in claim 47 wherein said cavity is cylindrical in shape, said cavity aperture comprises a circumferential slot in said cavity, and said lens comprises:
a toroidal quartz element conforming to said circumferential slot, said element bulged beyond the cylindrical outer diameter of said cavity.

49. Apparatus for collecting, concentrating and converting solar energy as defined in claim 48 wherein said toroidal quartz element includes a Fresnel lens on its inner surface.

50. Apparatus for converting radiant solar energy, comprising:
closed, opaque, black body cavity means for storing a transparent or translucent medium, said cavity means having an opening, the area of which is less than one percent of the wall area of the cavity means, said cavity means including means for repeatedly reflecting solar energy; and
means for focusing solar radiant energy into said cavity means through said opening for direct absorption of substantially all of said energy through repeated re-transmission through said medium in the volume of said medium.

51. A method for converting radiant solar energy, comprising:
concentrating radiant solar energy, and focusing said energy into an opaque black body cavity containing a fluid to be heated by said solar energy through a window; and
directly absorbing substantial all solar radiation entering said cavity through said window to heat said fluid within said cavity means by repeatedly reflecting solar energy from the walls of said cavity while maintaining the temperature within said fluid uniform, while maintaining the entire mass of said fluid at or above the temperature of the walls of said cavity.

52. Apparatus for converting radiant solar energy, comprising:
fixed, tubular opaque black body cavity means mounted on the earth's surface in a position which places the axis of said tubular cavity means parallel to the axis of the earth, said cavity means having a window and reflective walls;
a fluid medium to be heated contained in said cavity means; and
a solar collector mounted for rotation about the axis of said tubular cavity means to focus solar energy through said window during diurnal relative rotation of the sun and earth, said collector including means for redirecting said solar energy entering said tubular cavity means through said window to the direction of the axis of said tubular cavity means.

53. Apparatus for converting radiant solar energy, comprising:
   means for focusing said radiant solar energy;
   optically closed, opaque black body cavity means including means for repeatedly reflecting solar energy from the walls of said cavity;
   a transparent window positioned adjacent the focal point of said focusing means and sealed to said cavity means for admitting solar energy to said cavity;
   a transparent or translucent working medium in said cavity means, said medium directly absorbing said solar energy; and
   a lens located at said window for changing the direction of all radiant energy entering said cavity means.

54. Apparatus for converting solar energy into a heat energy by absorption of radiant energy in a fluid working medium, comprising:
   a sealed black body cavity container having reflective walls through which light cannot pass;
   an opening in a wall of said container;
   means for concentrating and directing solar energy through said opening into said container;
   said opening having an area which is more than 100 times smaller than the wall area of the container interior so that energy loss out of said opening is insignificant; and
   means for transporting fluid through said container for absorbing the energy entering said container through said opening.

55. The apparatus of claim 54 including means for varying the volume of said container in which said energy is absorbed by said working medium.

56. A system for converting solar energy into heat energy by absorption of radiant energy into a fluid working medium and recovery of the absorbed radiant energy as a high temperature fluid, comprising:
   a solar reflector for concentrating the solar energy;
   an enclosed black body cavity having reflective walls opaque to solar radiation;
   a window for admitting concentrated solar energy from said reflector into said cavity;
   a working medium in said cavity for absorbing said concentrated solar energy in said medium by absorption of radiant energy;
   said cavity having at least one linear dimension at least 100 times the diameter of the window; and
   means for transferring heat energy out of cavity.

57. A process for collecting solar energy, comprising:
   focusing energy from the sun into a sealed opaque black body cavity through a window in a wall of said cavity which is smaller in area than the area of said cavity by a factor of seventy and repeatedly reflecting said energy from the walls of said cavity; and
   conducting a working fluid through said cavity to extract heat therefrom.

58. Apparatus for converting solar radiant energy into high temperature fluid energy by absorption of the radiant energy by liquid density fluid in a black body absorption cavity, comprising:
   a closed, opaque black body cavity having reflective walls;
   a window in the cavity for transmitting radiant energy into the cavity, the effective area of the window being no greater than one percent of the area of the opaque walls of the cavity, the cavity and the window structure forming an effective black body absorber;
   a fluid in the cavity for absorbing radiant solar energy directly by heating of the fluid;
   means for concentrating and focusing solar radiant energy into the cavity for heating the fluid by absorbtion in the fluid as heat energy; and
   means for extracting the heat energy from the fluid.

59. The apparatus of claim 58 wherein the area of the opaque walls of the cavity is at least 200 times the effective area of the window.

* * * * *